United States Patent
Iwamoto et al.

(10) Patent No.: US 8,560,195 B2
(45) Date of Patent: Oct. 15, 2013

(54) AUTOMATIC TRANSMISSION AND HYDRAULIC CONTROL METHOD THEREFOR

(75) Inventors: Ikuhiro Iwamoto, Yokohama (JP); Osamu Sato, Fujisawa (JP)

(73) Assignee: Jatco Ltd, Fuji-shi (JP)

( * ) Notice: Subject to any disclaimer, the term of this patent is extended or adjusted under 35 U.S.C. 154(b) by 9 days.

(21) Appl. No.: 13/075,753

(22) Filed: Mar. 30, 2011

(65) Prior Publication Data

US 2011/0264343 A1    Oct. 27, 2011

(30) Foreign Application Priority Data

Apr. 21, 2010   (JP) .................................. 2010-97651

(51) Int. Cl.
   *G06F 17/00* (2006.01)
(52) U.S. Cl.
   USPC ........................................................ 701/66
(58) Field of Classification Search
   USPC ........................................................ 701/66
   See application file for complete search history.

(56) References Cited

U.S. PATENT DOCUMENTS

| | | | | |
|---|---|---|---|---|
| 5,403,245 | A | * | 4/1995 | Watanabe et al. ................ 477/54 |
| 5,492,508 | A | * | 2/1996 | Tsukamoto et al. ........... 475/125 |
| 5,709,629 | A | * | 1/1998 | Minowa et al. ................ 477/120 |
| 5,832,399 | A | | 11/1998 | Seichter et al. |
| 5,944,630 | A | * | 8/1999 | Omote ............................... 477/5 |
| 6,077,191 | A | * | 6/2000 | Minowa et al. ................ 477/109 |
| 7,318,789 | B2 | * | 1/2008 | Saitou et al. ................... 477/143 |
| 2005/0221956 | A1 | | 10/2005 | Saitou et al. |

FOREIGN PATENT DOCUMENTS

| | | |
|---|---|---|
| EP | 0 744 565 A2 | 11/1996 |
| GB | 2 455 196 A | 6/2009 |
| JP | 10-096465 A | 4/1998 |
| JP | 10-331962 A | 12/1998 |
| JP | 2002-098226 A | 4/2002 |

* cited by examiner

*Primary Examiner* — Tuan C. To
*Assistant Examiner* — Aaron L Troost
(74) *Attorney, Agent, or Firm* — Foley & Lardner LLP (57) ABSTRACT

A command hydraulic pressure learning control unit includes an output-side torque time rate of change calculation unit for calculating a time rate of change of a torque at an output side of an automatic transmission, and a correction unit for correcting a command hydraulic pressure when transmission of a drive force of a friction element to be engaged is started at the time of a next shift based on a difference between the calculated time rate of change of the output-side torque and a target value.

6 Claims, 9 Drawing Sheets

| GEAR POSITION | FRICTION ELEMENT | | | | |
|---|---|---|---|---|---|
| | L/C | H/C | REV/C | L&R/B | 2-4/B |
| 1ST | ○ | | | ○ | |
| 2ND | ○ | | | | ○ |
| 3RD | ○ | ○ | | | |
| 4TH | | ○ | | | ○ |
| REVERSE | | | ○ | ○ | |

AUTOMATIC TRANSMISSION AND HYDRAULIC CONTROL METHOD THEREFOR

TECHNICAL FIELD

The present invention relates to a technique for reducing a shift shock by learning a command hydraulic pressure at the time of engaging a friction element of an automatic transmission.

BACKGROUND ART

An automatic transmission shifts by engaging and releasing friction elements. At the time of engaging a friction element, a shift shock occurs unless a control pressure is appropriately controlled. Accordingly, a learning control is generally performed to store a hydraulic pressure at the time of engagement and reflect a stored value at the time of a next control.

A control hydraulic pressure of the frictional engagement element can be appropriately controlled by this learning control.

Such a control is disclosed in JP10-331962A. In JP10-331962A, a deviation amount from a proper value of an initial hydraulic pressure command value Ci for obtaining the value of an initial hydraulic pressure supplied to a high-speed frictional element to be engaged after the elapse of a predetermined time following the start of upshifting is calculated using an evaluation index (maximum control deviation emax) based on a change in the rotation speed of an input shaft in a gear transmission at an initial stage of an inertia phase at the time of upshifting in a vehicle automatic transmission. A learning control is performed by setting an initial hydraulic command value at the time of next upshifting using the deviation amount.

SUMMARY OF INVENTION

A shift shock, i.e. a change in the acceleration of a vehicle is produced by a torque variation of an output shaft associated with the engagement of a friction element.

This torque of the output shaft is expressed by the following equation.

$$T_O = T_C = T_T - I_{TM} dNt/dt$$

where:
$T_O$: output shaft torque
$T_C$: clutch (friction element to be engaged) torque
$T_T$: turbine torque
$I_{TM}$: inertia of transmission
Nt: turbine rotation speed In JP10-331062A, an initial command hydraulic pressure for a next shift is learned based on the change in the rotation speed of the input shaft. In other words, the command hydraulic pressure is controlled based on a gradient (dNt/dt) of the turbine rotation speed Nt.

Since the shift shock at the time of engagement depends on the output shaft torque $T_O$ as in the above equation, not only a change in the gradient (dNt/dt) of the turbine rotation speed Nt, but also the turbine torque $T_T$ influence the shift shock.

In JP10-331962A, the shift shock is reduced using only the gradient (dNt/dt) of the turbine rotation speed. That is, the turbine torque $T_T$ is not considered at all. Accordingly, with such a construction, the command hydraulic pressure obtained by learning cannot sufficiently reduce a shock at the start of engagement.

The command hydraulic pressure may be corrected in consideration of the turbine torque $T_T$ in the construction of JP10-331962A. In this case, the turbine torque $T_T$ needs to be separately calculated. However, it is difficult to accurately calculate the turbine torque $T_T$ and the control becomes more complicated such as a different calculation for each torque range based on an operating condition of an engine.

The present invention was developed in view of such a problem and aims to suppress a shift shock at the time of engaging a friction element by improving accuracy of an initial command hydraulic pressure obtained by learning without complicating a control.

According to an aspect of the present invention, an automatic transmission for shifting from one gear position to another gear position by changing a state of a friction element to be engaged from a released state to an engaged state based on a shift command, is provided. The automatic transmission comprises a shift command output unit which outputs a shift command from one gear position to another gear position; a command hydraulic pressure output unit which outputs a command hydraulic pressure for controlling an engaging force of the friction element to be engaged based on the shift command; and a command hydraulic pressure learning control unit which corrects a command hydraulic pressure when transmission of a drive force is started by starting engagement of the friction element to be engaged based on a shift result last time. The command hydraulic pressure learning control unit includes an output-side torque time rate of change calculation unit which calculates a time rate of change of a torque at an output side of the automatic transmission; and a correction unit which corrects a command hydraulic pressure when transmission of a drive force of the friction element to be engaged is started at the time of a next shift based on a difference between the calculated time rate of change of the output-side torque and a target value.

According to another aspect of the present invention, a control method of an automatic transmission for shifting from one gear position to another gear position by engaging and releasing a friction element, is provided. The control method comprises calculating a time rate of change of a torque at an output side of the automatic transmission when a shift from the one gear position to the other gear position is determined and a rate of change of a rotation speed at an input side of the automatic transmission is judged to be below a predetermined value; calculating a difference between the calculated time rate of change of the output-side torque and a target value; and increasing a command hydraulic pressure when transmission of a drive force of the friction element to be engaged is started at the time of a next shift if the output-side torque time rate of change is larger than the target value while decreasing a command hydraulic pressure when transmission of a drive force of the friction element to be engaged is started at the time of a next shift if the output-side torque time rate of change is smaller than the target value.

Embodiments and advantages of this invention will be described in detail below with reference to the attached figures.

DESCRIPTION OF THE PREFERRED EMBODIMENTS

Hereinafter, an embodiment of the present invention is described with reference to the drawings.

Figure 1:
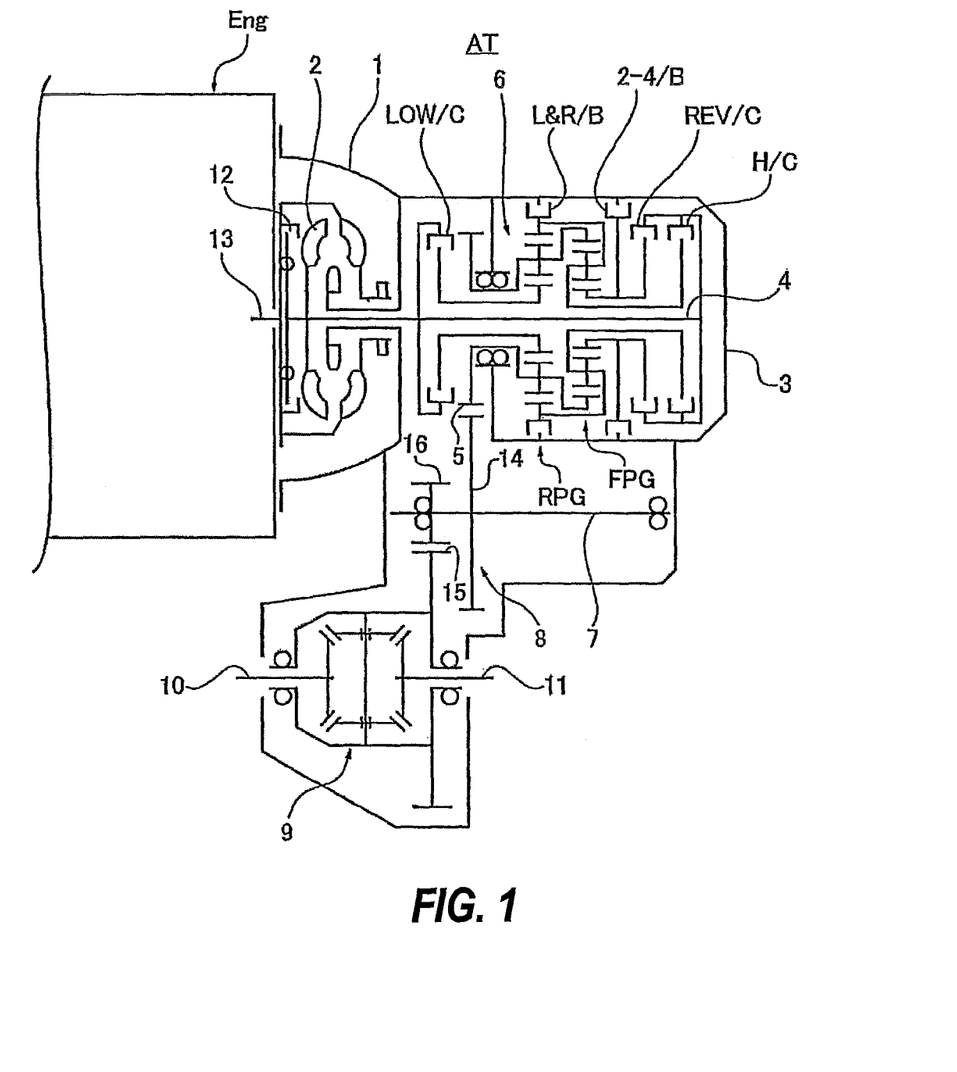
FIG. 1 is a diagram showing the construction of an automatic transmission according to an embodiment of the present invention.

FIG. 1 is a diagram showing the construction of an automatic transmission AT according to the embodiment of the present invention. This automatic transmission AT is the one with four forward gear positions and one reverse gear position.

As shown in FIG. 1, the automatic transmission AT includes a converter housing 1, a torque converter 2, a transaxle case 3, a transmission input shaft 4, a transmission output gear 5, a transmission mechanism 6, a reduction gear shaft 7, a reduction gear mechanism 8, a differential gear mechanism 9, a left drive shaft 10 and a right drive shaft 11.

The torque converter 2 including a lock-up clutch 12 for fulfilling a start function and a vibration damping function is arranged in the converter housing 1. The lock-up clutch 12 directly couples a crank shaft 13 of an engine Eng and the transmission input shaft 4 upon being engaged.

The transaxle case 3 is connected to the converter housing 1. The transmission mechanism 6 for fulfilling a transmission function, a reverse function and a neutral function, the reduction gear mechanism 8 for fulfilling a speed reduction function and the differential gear mechanism 9 for fulfilling a differential function are arranged in the transaxle case 3.

The transmission mechanism 6 is arranged between the transmission input shaft 4 and the transmission output gear 5 and is composed of a combination of a front planetary gear FPG, a rear planetary gear RPG, a low clutch L/C, a low & reverse brake L&R/B, a 2-4 brake 2-4/B, a reverse clutch REV/C and a high clutch H/C.

The reduction gear mechanism 8 is formed by mounting a first reduction gear 14 engaged with the transmission output gear 5 and a second reduction gear 16 engaged with a drive input gear 15 of the differential gear mechanism 9 on the reduction gear shaft 7.

The differential gear mechanism 9 equally distributes a drive force input from the drive input gear 15 to the left drive shaft 10 and the right drive shaft 11 while allowing differentials and transmits the drive force to unillustrated left and right front wheels.

Figure 2:
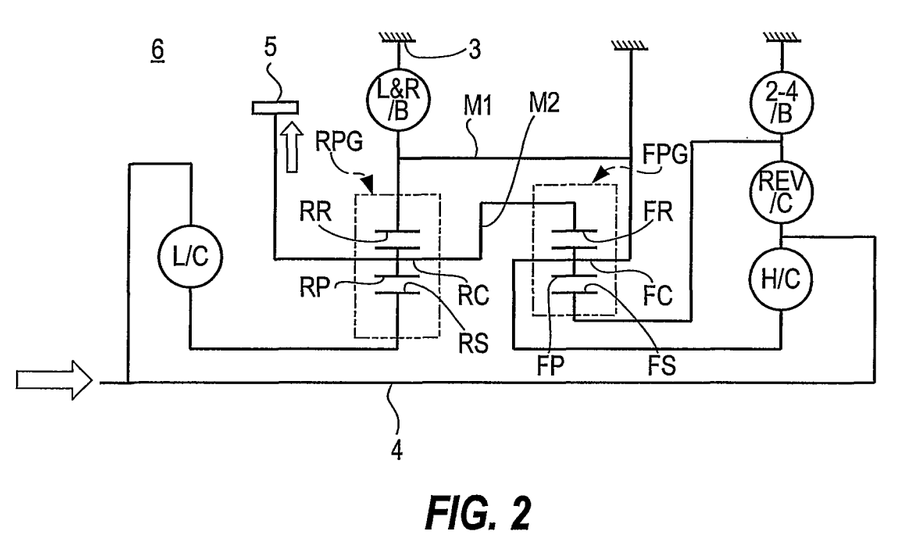
FIG. 2 is a diagram showing functions of a transmission mechanism of the automatic transmission according to the embodiment of the present invention.

FIG. 2 is a diagram showing functions of the transmission mechanism 6 of the automatic transmission according to the embodiment of the present invention.

The transmission mechanism 6 includes the single-pinion type front planetary gear FPG and rear planetary gear RPG as planetary gears and the low clutch L/C, the low & reverse brake L&R/B, the 2-4 brake 2-4/B, the reverse clutch REV/C and the high clutch H/C as friction elements.

The front planetary gear FPG includes a front sun gear FS, a front ring gear FR and a front carrier FC carrying a front pinion FP engaged with both gears FS, FR.

The rear planetary gear RPG includes a rear sun gear RS, a rear ring gear RR and a rear carrier RC carrying a rear pinion RP engaged with both gears RS, RR.

The front carrier FC and the rear ring gear RR are integrally coupled by a first rotary member M1. Further, the front ring gear FR and the rear carrier RC are integrally coupled by a second rotary member M2.

Accordingly, by combining the front planetary gear FPG and the rear planetary gear RPG, four rotary elements (front sun gear FS, rear sun gear RS, first rotary member M1, second rotary member M2) obtained by subtracting two rotary elements from six rotary elements are included.

The front sun gear FS is disposed to be able to be connected to and disconnected from the transmission input shaft 4 via the reverse clutch REV/C and to be able to be fixed to the transaxle case 3 via the 2-4 brake 2-4/B.

The rear sun gear RS is disposed to be able to be connected to and disconnected from the transmission input shaft 4 via the low clutch L/C.

The first rotary member M1 is disposed to be able to be fixed to the transaxle case 3 via the low & reverse brake L&R/B and to be able to be connected to and disconnected from the transmission input shaft 4 via the high clutch H/C.

The second rotary member M2 is directly coupled to the transmission output gear 5.

Figure 3:
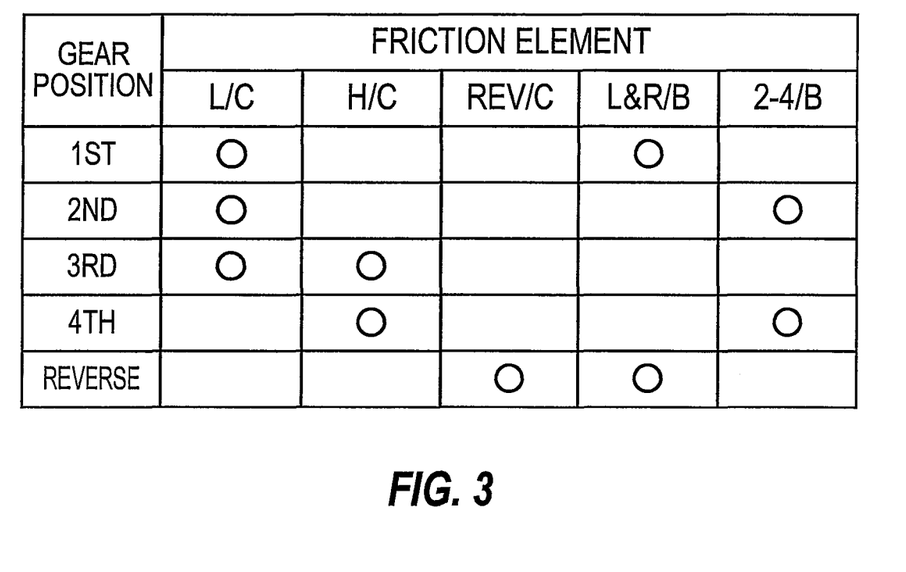
FIG. 3 is an engagement table showing engaged states of respective frictional engagement elements in each gear position of the automatic transmission according to the embodiment of the present invention.

FIG. 3 is an engagement table showing engaged states of the respective frictional engagement elements in each gear position of the automatic transmission according to the embodiment of the present invention. Note that each circle in FIG. 3 indicates that the corresponding frictional engagement element is in the engaged state.

The gear positions, i.e. four forward gear positions and one reverse gear position of the automatic transmission AT are shifted by replacing engaged states, i.e. by releasing one friction element that is engaged and engaging one friction element that is released out of the respective friction elements provided in the transmission mechanism 6.

A "first gear position" is achieved by engaging the low clutch L/C and the low & reverse brake L&R/B. A "second gear position" is achieved by engaging the low clutch L/C and the 2-4 brake 2-4/B.

A "third gear position" is achieved by engaging the low clutch L/C and the high clutch H/C. A "fourth gear position" is achieved by engaging the high clutch H/C and the 2-4 brake 2-4/B.

A "reverse gear position" is achieved by engaging the reverse clutch REV/C and the low & reverse brake L&R/B.

Figure 4:
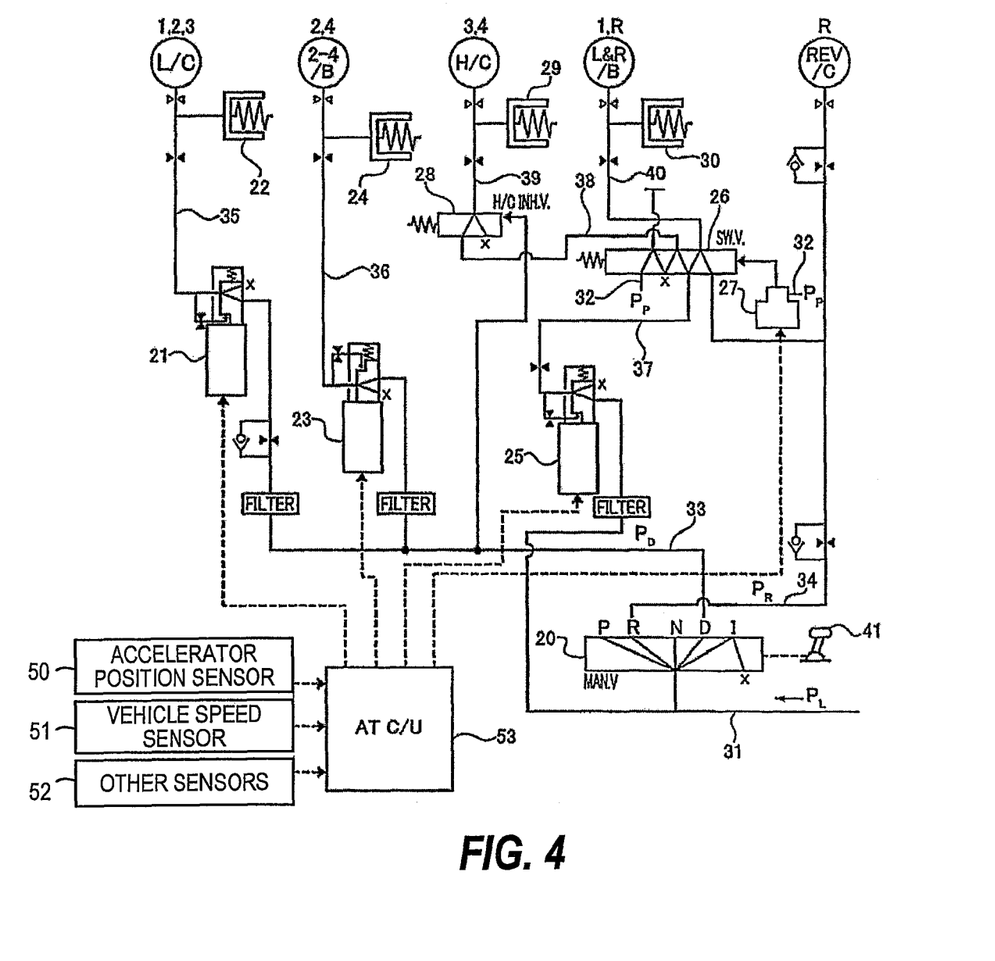
FIG. 4 is a diagram of a hydraulic control system according to the embodiment of the present invention.

FIG. 4 is a diagram of a hydraulic control system showing a hydraulic control circuit for the respective friction elements and an electronic shift control system according to the embodiment of the present invention.

As shown in FIG. 4, this hydraulic control circuit includes a manual valve 20, a low clutch pressure adjusting valve 21, a low clutch accumulator 22, a 2-4 brake pressure adjusting valve 23, a 2-4 brake accumulator 24, a dual purpose pressure adjusting valve 25, a switching valve 26, a switching solenoid 27, a high clutch inhibitor valve 28, a high clutch accumulator 29 and a low & reverse brake accumulator 30.

The hydraulic control circuit also includes a line pressure oil passage 31, a pilot pressure oil passage 32, a D position pressure oil passage 33, an R position pressure oil passage 34, a low clutch pressure oil passage 35, a 2-4 brake pressure oil passage 36, a dual purpose pressure output oil passage 37, a first high clutch pressure oil passage 38, a second high clutch pressure oil passage 39 and a low & reverse brake pressure oil passage 40.

The manual valve 20 is a manually operable valve which operates in response to the operation of a selector 41 by a driver.

The selector 41 includes a D position where the first to fourth gear positions are achieved, an H position where the first and second gear positions are achieved, an R position where the reverse gear position is achieved, a N position where all the clutches are released and a P position for parking.

The manual valve 20 introduces a line pressure PL from the line pressure oil passage 31 to the D position pressure oil passage 33 when the D position is selected and introduces the line pressure PL from the line pressure oil passage 31 to the R position pressure oil passage 34 when the R position is selected.

The low clutch pressure adjusting valve 21 is a normally high three-way high-capacity linear solenoid valve and introduces a low clutch pressure adjusted based on a D position pressure PD from the D position pressure oil passage 33 as a source pressure to the low clutch L/C via the low clutch pressure oil passage 35 when the low clutch L/C is engaged ($1^{st}$, $2^{nd}$, $3^{rd}$ gear positions).

The low clutch pressure supplied to the low clutch L/C is drained when the low clutch L/C is released ($4^{th}$, R gear positions).

The 2-4 brake pressure adjusting valve 23 is a normally low three-way high-capacity linear solenoid valve and introduces a 2-4 brake pressure adjusted based on the D position pressure PD from the D position pressure oil passage 33 as a source pressure to the 2-4 brake 2-4/B via the 2-4 brake pressure oil passage 36 when the 2-4 brake 2-4/B is engaged ($2^{nd}$, $4^{th}$ gear positions).

Further, the 2-4 brake pressure supplied to the 2-4 brake 2-4/B is drained when the 2-4 brake 2-4/B is released ($1^{st}$, $3^{rd}$, R gear positions).

The dual purpose pressure adjusting valve 25 is a normally high three-way high-capacity linear solenoid valve for generating a hydraulic pressure when power supply is off and introduces a hydraulic pressure adjusted based on the hydraulic pressure (line pressure PL) supplied without going through the manual valve 20 as a source pressure to the high clutch H/C or the low & reverse brake L&R/B via the switching valve 26.

In other words, the dual purpose pressure adjusting valve 25 controls hydraulic pressures to the two friction elements, i.e. the high clutch H/C and the low & reverse brake L&R/B since the high clutch H/C ($3^{rd}$, $4^{th}$ gear positions) and the low & reverse brake L&R/B ($1^{st}$, R gear positions) are engaged in mutually different selector positions and in different gear positions.

Out of these friction elements, the high clutch H/C is a clutch for coupling the first rotary member M1, which is a rotary member other than the transmission output gear 5 as a transmission output member, and the transmission input shaft 4.

When the high clutch H/C is engaged during idling at the time of selection of the N position in a state where the transmission output gear 5 is fixed such as by depressing an unillustrated brake pedal, the first rotary member M1 is rotated by a torque of the transmission input shaft 4.

The switching valve 26 supplies a generated hydraulic pressure from the dual purpose pressure adjusting valve 25 to the high clutch H/C when the switching solenoid 27, which is an on ON/Off solenoid having a characteristic of not generating a hydraulic pressure when power supply is off (hereinafter, normally low), is off (no hydraulic pressure is generated) and the D position (forward gear position) is selected.

The switching valve 26 is switched such that the supply of the hydraulic pressure from the dual purpose pressure adjusting valve 25 supplied to the low & reverse brake L&R/B when the switching solenoid 27 is on (hydraulic pressure is generated) and a shift is being made at the time of selection of the R position (R gear position).

Further, the switching valve 26 opens a port for supplying an R position pressure PR generated from the manual valve 20 at the time of selection of the R position to the low & reverse brake L&R/B when the switching solenoid 27 is off and the switching valve 26 is in a position to supply the generated hydraulic pressure from the dual purpose pressure adjusting valve 25 to the high clutch inhibitor valve 28.

The high clutch inhibitor valve 28 is arranged between the switching valve 26 and the high clutch H/C and switched using the D position pressure PD generated at the time of selection of the D position as a signal pressure.

In other words, the high clutch inhibitor valve 28 connects between the dual purpose pressure adjusting valve 25 and the high clutch H/C when the D position pressure PD acts and disconnects between the dual purpose pressure adjusting valve 25 and the high clutch H/C when the D position pressure PD does not act.

As shown in FIG. 4, the electronic shift control system includes an accelerator position sensor 50, a vehicle speed sensor 51, other sensors 52 (pulse sensor, inhibitor switch, etc.) and an AT control unit 53.

The AT control unit 53 controls the transmission mechanism 6 based on information (e.g. turbine rotation speed detected by the pulse sensor) input from the accelerator position sensor 50, the vehicle speed sensor 51 and the other sensors 52.

For example, the AT control unit 53 searches an optimal gear position based on the position of a driving point determined by an accelerator position APO and the vehicle speed VSP on a shift map during driving with the D position selected, and outputs control commands (shift commands) for providing the searched gear position to the low clutch pressure adjusting valve 21, the 2-4 brake pressure adjusting valve 23, the dual purpose pressure adjusting valve 25 and the switching solenoid 27.

A shift command output unit is formed by the AT control unit 53 searching the optimal gear position based on the position of the driving point determined by the accelerator position APO and the vehicle speed VSP on the shift map and outputting the shift commands for providing the searched gear position in this way.

Note that the shift map is a map written with an up-shift line and a down-shift line in relation to the accelerator position and the vehicle speed.

Next, an operation during a shift in the embodiment of the present invention is described.

Here is described an operation at the time of downshifting from the second gear position to the first gear position during coast driving.

Note that a driving condition in which an acceleration pedal is not depressed and an engine rotation speed and a vehicle speed are substantially constant when a vehicle is driving is called coast driving in the embodiment of the present invention.

Figure 5:
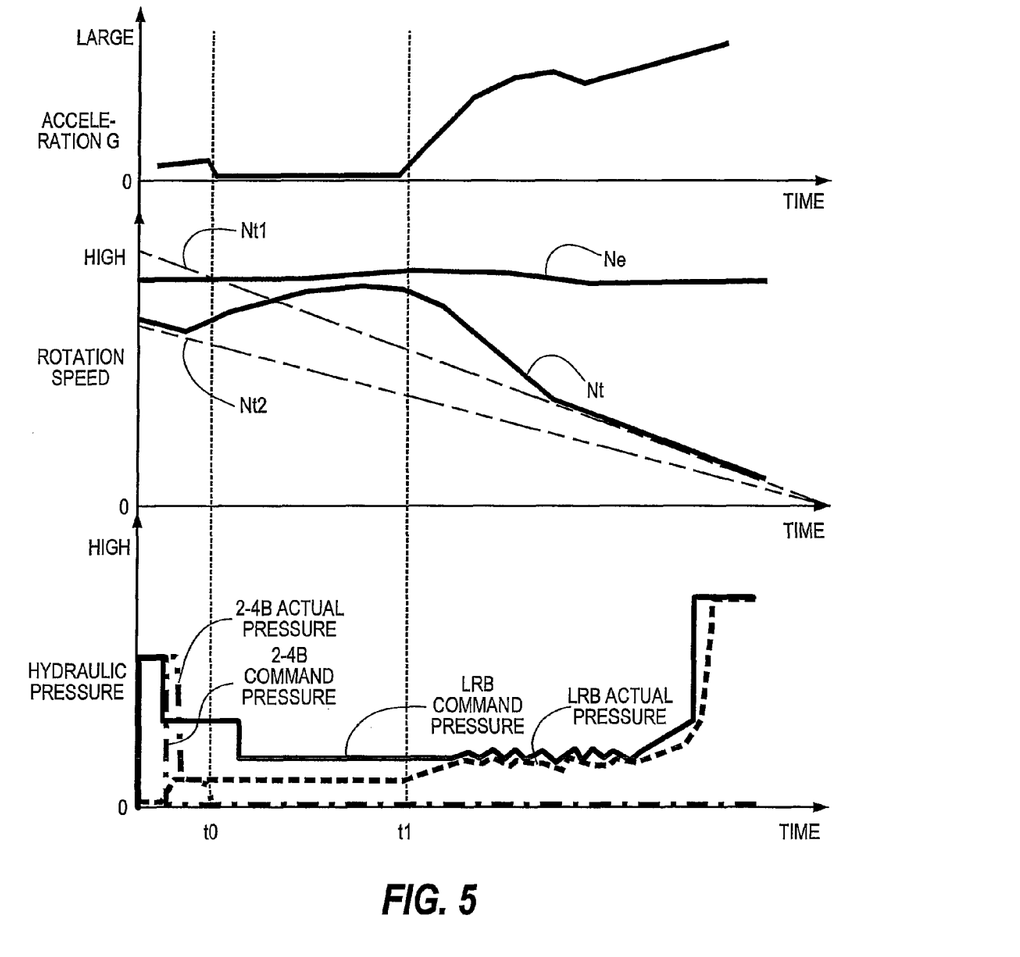
FIG. 5 is a time chart showing a down shift operation from a second gear position to a first gear position during coast driving in the automatic transmission according to the embodiment of the present invention.

FIG. 5 is a time chart showing a down shift operation from the second gear position to the first gear position during coast driving in the automatic transmission according to the embodiment of the present invention.

As shown in FIG. 3 described above, downshifting from the second gear position to the first gear position is performed by releasing the 2-4 brake 2-4/B and engaging the low & reverse brake L&R/B.

Specifically, the following operation is performed.

The AT control unit 53 controls the respective command hydraulic pressures to release the 2-4 brake 2-4/B and engage the low & reverse brake L&R/B upon determining a shift from the second gear position to the first gear position in accordance with the shift map based on the information from the accelerator position sensor 50, the vehicle speed sensor 51 and the other sensors 52.

First, the AT control unit 53 commands the 2-4 brake pressure adjusting valve 23 to supply a command hydraulic pressure for draining a pressure of the 2-4 brake 2-4/B which is to be released. The command hydraulic pressure at this time is shown by dashed-dotted line.

The 2-4 brake pressure adjusting valve 23 is controlled to be at a drain position by this. By this control, an actual hydraulic pressure (actual pressure) acting on the 2-4 brake 2-4/B is gradually reduced toward zero. The actual pressure is shown by chain double-dashed line.

This leads to a neutral state where none of the clutches is engaged in the transmission mechanism 6 (timing t0). In the neutral state, the turbine rotation speed Nt rises and then increases from a second-speed synchronous rotation speed Nt2 beyond a first-speed synchronous rotation speed Nt1.

Subsequently, the AT control unit 53 commands the dual purpose pressure adjusting valve 25 to supply an initial command hydraulic pressure to control an engaging force of the engagement-side low & reverse brake L&R/B. The command hydraulic pressure is shown by solid line and an actual pressure is shown by dotted line.

More specifically, after a control by a predetermined command hydraulic pressure (called "PA0") is first performed for a predetermined time to make a clearance of the low & reverse brake L&R/B zero, it is waited on standby at a predetermined command hydraulic pressure (called "PA1") lower than the command hydraulic pressure PA0.

The magnitude of this command hydraulic pressure PA1 controls a timing at which friction plates of the low & reverse brake L&R/B come into contact (touch) to start torque transmission. The touch timing of the low &reverse brake L&R/B is set to be after the first-speed synchronous rotation speed Nt1 is surpassed.

After the touch of the low & reverse brake L&R/B, the command hydraulic pressure is controlled to a command hydraulic pressure (called "PA2") lower than the command hydraulic pressure PA1. The low & reverse brake L&R/B transmits a turbine torque $T_T$ to an output side while having a torque capacity by the control of this command hydraulic pressure PA2 (timing t1).

The turbine rotation speed Nt gradually decreases to the first-speed synchronous rotation speed Nt1 by the low & reverse brake L&R/B having a torque capacity.

The AT control unit 53 feedback controls the command hydraulic pressure of the low & reverse brake L&R/B based on the engine rotation speed, the turbine rotation speed Nt and the like after the engagement of the low & reverse brake L&R/B is started.

The engagement of the low & reverse brake L&R/B is completed when the turbine rotation speed Nt and the first-speed synchronous rotation speed become substantially equal. When the engagement is completed, the AT control unit 53 controls the command hydraulic pressure of the low & reverse brake L&R/B to be maximized to completely engage the low & reverse brake L&R/B.

Downshifting from the second gear position to the first gear position is completed by the above control. Note that a command hydraulic pressure output unit is formed by outputting a command hydraulic pressure to control an engaging force of the friction element to be engaged by the control of the AT control unit 53 in this way.

Here, when the friction element (low & reverse brake L&R/B) touches and starts being engaged during a shift from the second gear position to the first gear position, acceleration G of the vehicle changes by having the resulting torque capacity as shown in FIG. 5. This change is transmitted as a shift shock to the driver.

The magnitude of a shift shock depends on a change of the acceleration G, i.e. a gradient of the acceleration G. A large shock is transmitted if the gradient of the acceleration G is large and a small shock is transmitted if the gradient of the acceleration G is small. Since a sense of discomfort is given to the driver if the shift shock is large, merchantability is reduced.

Particularly, since the driver is not operating the acceleration pedal during coast driving, a shift is not intended by the driver and it is desired to reduce a shift shock so as not to give any sense of discomfort to the driver.

The acceleration G changes because the low & reverse brake L&R/B touches to change the torque transmission in downshifting from the second gear position to the first gear position.

In other words, the acceleration G suddenly changes if the torque suddenly changes while moderately changing if the torque moderately changes.

Figure 6:
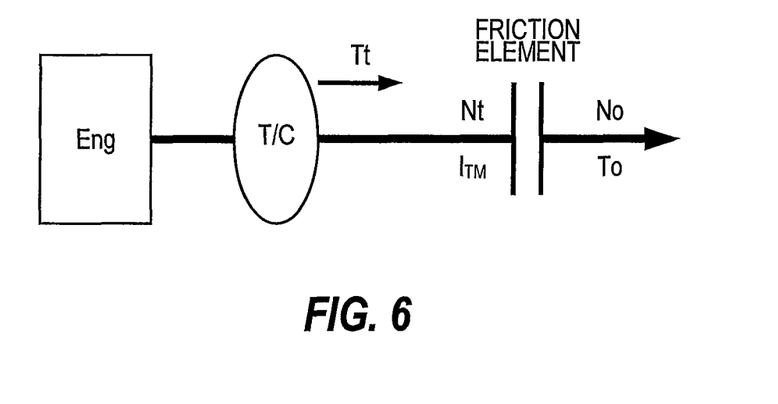
FIG. 6 is a diagram showing torque transmission in the automatic transmission according to the embodiment of the present invention.

FIG. 6 is a diagram showing torque transmission in the automatic transmission AT according to the embodiment of the present invention.

An output of the engine Eng is transmitted as a turbine torque $T_T$ to the transmission mechanism 6 via the torque converter 2. In the transmission mechanism 6, a rotational torque is transmitted to an output shaft via the gears and the friction elements. In this way, the turbine rotation speed Nt is output as an output shaft rotation speed No.

Here, as to the output shaft torque $T_O$ between the start of the engagement of the friction element and the completion of the engagement, torque as much as a clutch capacity $T_C$ out of turbine torque $T_T$ is transmitted to an output side since the turbine rotation speed Nt is higher than the first-speed synchronous rotation speed Nt1.

Further, the turbine torque $T_T$ is also consumed by an inertia force (inertia $I_{TM}$) by the rotation of the transmission mechanism 6.

Accordingly, a relationship at this time is expressed by the following equation (1).

$$T_O = T_C = T_T I_{TM} dNt/dt \quad (1)$$

where:
$T_O$: output shaft torque
$T_C$: clutch (friction element to be engaged) torque
$T_T$: turbine torque
$I_{TM}$: inertia of transmission
Nt: turbine rotation speed Here, a time rate of change (gradient of a graph) of the output shaft torque $T_O$ is obtained by a time differential of the output shaft torque $T_O$ as in the following equation (2).

$$dT_O/dt = dT_C/dt = dT_T/dt - I_{TM} d^2Nt/dt^2 \quad (2)$$

Here, $dT_T/dt$ as an element on the right side of the equation (2) is a time rate of change of the turbine torque $T_T$. Since a change of the turbine torque $T_T$ in a very short time immediately after the start of the engagement is very small, it can be ignored.

Accordingly, the following equation (3) holds.

$$dT_O/dt = -I_{TM} d^2Nt/dt^2 \quad (3)$$

As described above, the inertia $I_{TM}$ is a constant specific to the transmission mechanism 6 and can be calculated beforehand. Accordingly, a change of the output shaft torque $T_O$ can be calculated by calculating a second-order differential value of the turbine rotation speed Nt, i.e. a further time rate of change of the time rate of change (gradient of the graph) of the turbine rotation speed Nt.

This time change of the output shaft torque $T_O$ corresponds to the acceleration G. Accordingly, the acceleration G can be controlled based on $d^2Nt/dt^2$ that is the second-order differential value of the turbine rotation speed Nt.

Figure 7:
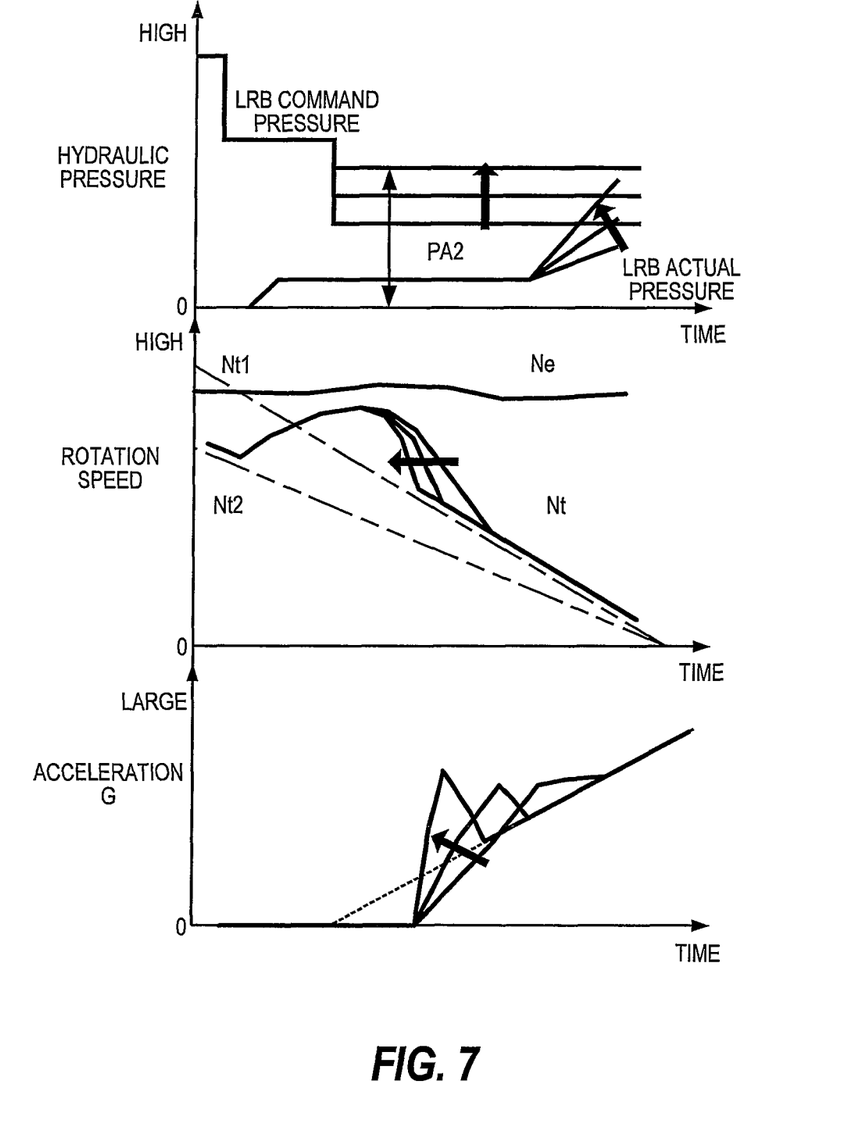
FIG. 7 is a diagram showing a command hydraulic pressure of a low & reverse brake, a change in turbine rotation speed and a change in acceleration.

FIG. 7 is a graph showing the command hydraulic pressure (PA2) of the low & reverse brake L&R/B, a change of the turbine rotation speed Nt and a change of the acceleration G.

At the time of a shift from the second gear position to the first gear position, $d^2Nt/dt^2$ that is the second-order differential value of the turbine rotation speed Nt is calculated, the command hydraulic pressure (PA2) at the time of engagement is corrected to suppress a shift shock based on the calculated value, and an engagement control is performed using this correction value at the time of a next shift.

For example, if the gradient of the rate of change of the turbine rotation speed Nt is large, a starting speed of torque capacity transmission of the friction element is fast. In this case, a control is performed to reduce the command hydraulic pressure so that the torque capacity transmission of the friction element is moderately started.

It is not necessarily sufficient to merely perform a control to reduce the command hydraulic pressure. The friction element is composed of friction plates, an oil chamber, return spring, etc. Since the friction element is not engaged unless a control pressure exceeds a biasing force of the return spring, a lower limit of the command hydraulic pressure is desirably a value exceeding the biasing force of the return spring.

Since the biasing force of the return spring has a mechanical error and a tolerance, the following control is performed by the AT control unit 53 to learn an optimal command hydraulic pressure capable of suppressing a shift shock without falling below the biasing force.

Figure 8:
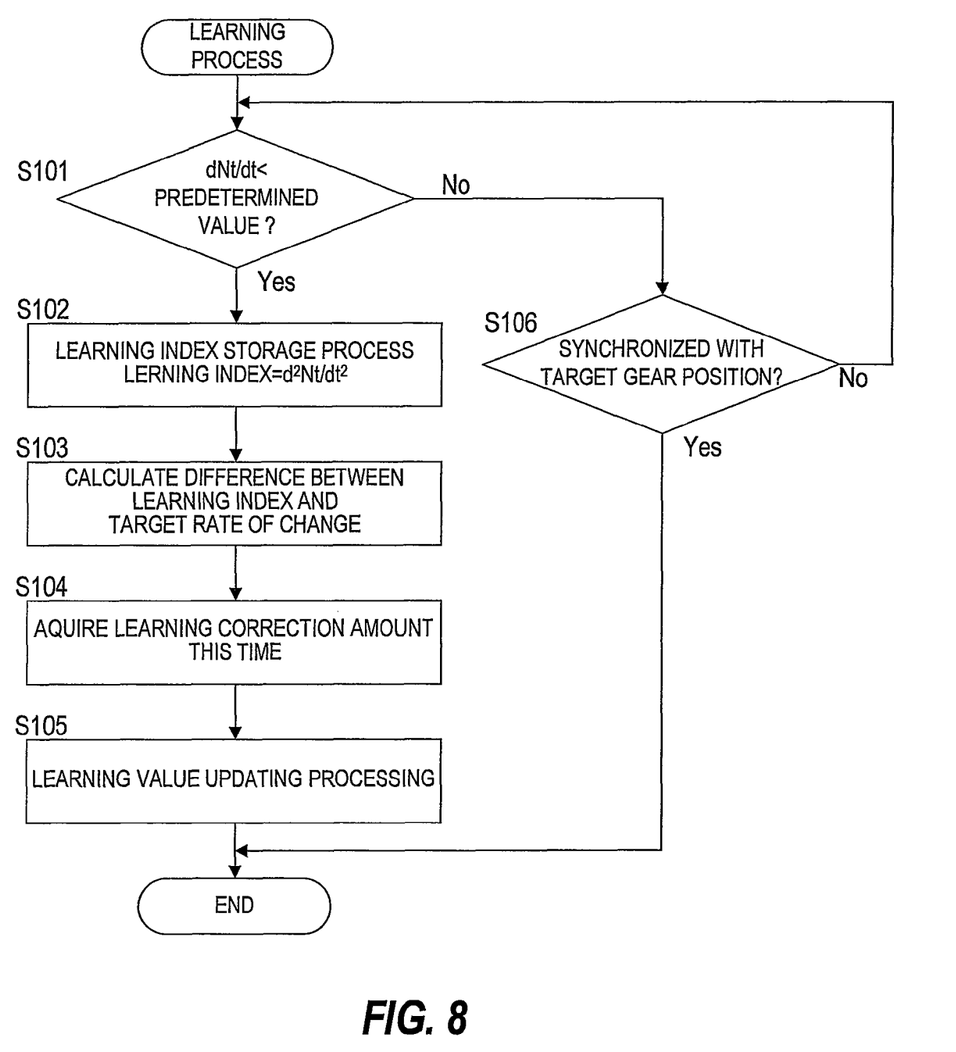
FIG. 8 is a flow chart of a process in an AT control unit according the embodiment of the present invention.

FIG. 8 is a flow chart of a process in the AT control unit 53 according to the embodiment of the present invention.

This flow chart is implemented when the AT control unit 53 determines a shift command upon determining downshifting from the second gear position to the first gear position during coast driving.

When the AT control unit 53 determines the shift command of downshifting from the second gear position to the first gear position, it is further determined whether or not a first-order differential value dNt/dt of the turbine rotation speed Nt is smaller than a predetermined value (Step S101).

This predetermined value is a threshold value used to determine whether or not torque transmission has been started by the touch of the friction plates of the friction element to be engaged (low &reverse brake L&R/B) and determine that the first-order differential value of the turbine rotation speed Nt, i.e. a time variation of the turbine rotation speed Nt has changed from increasing to decreasing.

More specifically, when the turbine rotation speed Nt is in excess of the first-speed synchronous rotation speed Nt1, the friction element can be engaged at any time. However, by setting a timing of engagement later than the timing when the turbine rotation speed Nt changes from increasing to decreasing, a shock can be further reduced.

As an example of determining a point of time when the turbine rotation speed Nt changes from increasing to decreasing, it is preferred to set the predetermined value so that determination of Step S101 holds when dNt/dt<−250 rpm/s.

Note that another method may be employed so long as the point of time when the turbine rotation speed Nt changes from increasing to decreasing can be determined.

This process proceeds to Step S102 if the first-order differential value dNt/dt of the turbine rotation speed Nt is determined to be smaller than the predetermined value. This process proceeds to Step S106 if the first-order differential value dNt/dt of the turbine rotation speed Nt is determined not to be smaller than the predetermined value.

In Step S102, the AT control unit 53 performs a learning index storage process. Specifically, the second-order differential value $d^2Nt/dt^2$ of the turbine rotation speed Nt that is a learning index to correct the command hydraulic pressure (PA2) of the friction element to be engaged is calculated and stored.

Note that an output-side torque time rate of change calculation unit is formed by the AT control unit 53 calculating the second-order differential value (further time rate of change of the time rate of change) of the turbine rotation speed Nt as the time rate of change of the output-side torque.

Subsequently, the AT control unit 53 calculates a difference between the stored learning index and a target rate of change (Step S103).

Note that this target rate of change is preset to such a value that the rate of change of the output torque $T_O$ based on the second-order differential value $d^2Nt/dt^2$ of the turbine rotation speed Nt suppresses a shift shock and sufficiently exceeds the biasing force of the return spring of the friction element.

Subsequently, the AT control unit 53 acquires a learning correction amount this time based on a correction amount map stored beforehand and the difference calculated in Step S103 (Step S104).

Figure 9:
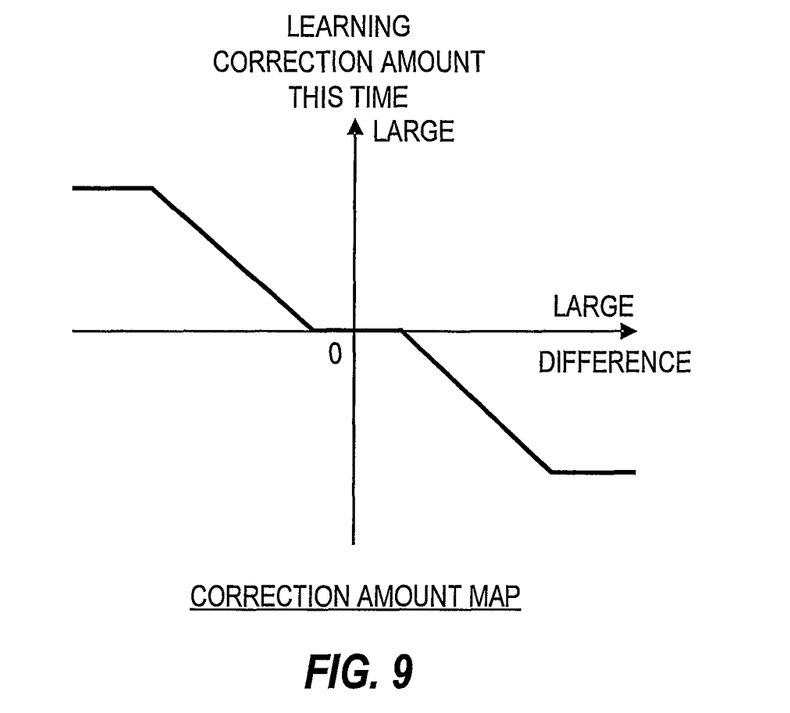
FIG. 9 is a diagram showing an example of a correction amount map according to the embodiment of the present invention.

An example of this correction amount map is shown in FIG. 9.

The correction amount map is so set that the correction amount is small if a difference value is large while being large if the difference value is small based on the difference calculated in Step S103.

An upper limit is set for correction amounts to be learned at one time so that an extremely large command hydraulic pressure is not output even if a faulty signal is input to the AT control unit 53 due to a sensor failure or the like.

If the difference is small, the correction value is set at 0 since no correction is necessary. Further, there is a range of difference values, for which the correction value is set at 0, to prevent hunting of the control.

Note that a correction unit is formed by the AT control unit 53 correcting a command hydraulic pressure at the time of a next shift based on a difference between the time rate of change of the output-side torque (second-order differential value of the turbine rotation speed Nt) and a target rate of change in this way.

Referring back to FIG. 8, the AT control unit 53 performs a learning value updating process in Step S105.

Specifically, a new stored value is calculated by adding the learning correction amount this time acquired in Step S104 to the presently stored value. The calculated stored value indicates a command hydraulic pressure to be set at the time of a next shift.

Thereafter, the process by this flow chart is finished.

If the first-order differential value dNt/dt of the turbine rotation speed Nt is determined not to be smaller than the predetermined value in Step S101, this process proceeds to Step S106 to determine synchronization with the target gear position (here, from the second gear position to the first gear position). In the case of determining synchronization with the target gear position, the process by this flow chart is finished.

If no synchronization with the target gear position is determined, a return is made to Step S101 and the process by this flow chart is repeated.

By the process described above, the AT control unit 53 calculates the correction amount of the command hydraulic pressure of the friction element to be engaged and performs the learning control based on the calculated correction amount, whereby a shift shock at the time of engaging the friction element can be controlled.

In other words, a command hydraulic pressure correction unit is formed by the AT control unit 53 correcting a command hydraulic pressure when transmission of a drive force is started by starting the engagement of the friction element to be engaged based on a shift result last time.

As described above, in the automatic transmission according to the embodiment of the present invention, an engaging pressure of the low & reverse brake L&R/B as a friction element to be engaged is learned and corrected according to a variation of the output torque $T_O$ in downshifting from the second gear position to the first gear position during coast driving.

More specifically, since the variation of the output torque $T_O$ (inclination of the graph) is based on $d^2Nt/dt^2$ as the second-order differential value of the turbine rotation speed Nt, the correction value is calculated based on the value of this $d^2Nt/dt^2$.

By performing an engagement control by the command hydraulic pressure based on this correction value at the time of a next shift, a learning control for suppressing the shift shock at the time of engaging the friction element can be performed.

Particularly, since the turbine rotation speed Nt can be directly detected by the AT control unit 53 using the pulse sensor or the like, an error is small and a calculation amount is also small. Thus, accuracy of the command hydraulic pressure obtained by learning can be increased and a shift shock at the time of engaging the friction element can be suppressed.

Although the four-speed automatic transmission has been described as an example in the above embodiment of the present invention, the present invention is not limited thereto and may be applied to other stepped transmissions.

Although the learning control of the friction element to be engaged (low & reverse brake L&R/B) in downshifting from the second gear position to the first gear position during coast driving has been described as an example in the above embodiment of the present invention, the present invention is not limited thereto.

In other words, the present invention is similarly applicable to a learning control of an initial command hydraulic pressure if a shift control is such that the turbine rotation speed Nt is reduced in downshifting as the friction element to be engaged is engaged.

It goes without saying that the present invention is not limited to the above embodiment and various changes and modifications within the scope of the technical concept of the present invention are embraced thereby.

This application claims priority based on Japanese Patent Application No. 2010-97651, filed with the Japan Patent Office on Apr. 21, 2010, the entire content of which is incorporated into this specification by reference.

What is claimed is:

1. An automatic transmission for shifting from one gear position to another gear position by changing a state of a friction element to he engaged from a released state to an engaged state based on a shift command, comprising:
   a hydraulic control circuit which controls a hydraulic pressure to the friction element;
   a control unit electrically connected to the hydraulic control circuit and configured to:
      output the shift command from the one gear position to the another gear position;
      output a command hydraulic pressure to the hydraulic control circuit for controlling an engaging force of the friction element to be engaged based on the shift command;
      calculate a time rate of change of a torque at an output side of the automatic transmission;
      correct the command hydraulic pressure when transmission of a drive force of the friction element to be engaged is started at a time of a next shift based on a difference between the calculated time rate of change of the output-side torque and a target value;
      increase the command hydraulic pressure when the transmission of the drive force of the friction element to be engaged is started at the time of the next shift if the output-side torque time rate of change is larger than the target value, and
      decrease the command hydraulic pressure when the transmission of the drive force of the friction element to be engaged is started at the time of the next shift if the output-side torque time rate of change is smaller than the target value.

2. The automatic transmission according to claim 1, wherein the control unit is configured to calculate the output-side torque time rate of change in a form of a second-order differential value of a rotation speed at an input side of the automatic transmission.

3. A control method of an automatic transmission for shifting from one gear position to another gear position by engaging and releasing a friction element, comprising:
   calculating a time rate of change of a torque at an output side of the automatic transmission when a shift from the one gear position to the another gear position is determined and a rate of change of a rotation speed at an input side of the automatic transmission is judged to be below a predetermined value;
   calculating a difference between the calculated time rate of change of the output-side torque and a target value; and
   increasing a command hydraulic pressure when transmission of a drive force of the friction element to be engaged is started at a time of a next shift if the output-side torque time rate of change is larger than the target value while decreasing the command hydraulic pressure when transmission of the drive force of the friction element to be engaged is started at the time of the next shift if the output-side torque time rate of change is smaller than the target value.

4. The control method according to claim 3, wherein the output-side torque time rate of change is calculated in a form of a second-order differential value of the rotation speed at the input side of the automatic transmission.

5. An automatic transmission for shifting from one gear position to another gear position by changing a state of a friction element to be engaged from a released state to an engaged state based on a shift command, comprising:
 shift command output means for outputting the shift command from the one gear position to the another gear position;
 command hydraulic pressure output means for outputting a command hydraulic pressure for controlling an engaging force of the friction element to he engaged based on the shift command; and
 command hydraulic pressure learning control means for correcting the command hydraulic pressure when transmission of a drive force is started by starting engagement of the friction element to be engaged based on a shift result last time, wherein the command hydraulic pressure learning control means includes:
  an output-side torque time rate of change calculation means for calculating a time rate of change of a torque at an output side of the automatic transmission; and
  a correction means for correcting the command hydraulic pressure when the transmission of the drive force of the friction element to be engaged is started at a time of a next shift based on a difference between the calculated time rate of change of the output-side torque and a target value, wherein the correction means
  increases the command hydraulic pressure when the transmission of the drive force of the friction element to be engaged is started at the time of the next shift if the output-side torque time rate of change is larger than the target value, and
  decreases the command hydraulic pressure when the transmission of the drive force of the friction element to be engaged is started at the time of the next shift if the output-side torque time rate of change is smaller than the target value.

6. The automatic transmission according to claim 5, wherein the output-side torque time rate of change calculation means calculates the output-side torque time rate of change in a form of a second-order differential value of a rotation speed at an input side of the automatic transmission.

* * * * *